United States Patent [19]

Edwards et al.

[11] Patent Number: 5,045,007
[45] Date of Patent: Sep. 3, 1991

[54] METHOD OF SALVAGING A COLOR SELECTION ELECTRODE FOR A CRT

[75] Inventors: James F. Edwards, Lancaster; Donald W. Bartch, Wrightsville, both of Pa.

[73] Assignee: Thomson Consumer Electronics, Inc., Indianapolis, Ind.

[21] Appl. No.: 615,546

[22] Filed: Nov. 19, 1990

[51] Int. Cl.[5] ............................................. H01J 9/50
[52] U.S. Cl. ........................................ 445/2; 134/1; 252/79.3
[58] Field of Search ............... 445/2; 134/1; 252/79.3

[56] References Cited

U.S. PATENT DOCUMENTS

| | | | |
|---|---|---|---|
| 3,033,710 | 5/1962 | Hightower et al. | 134/1 |
| 3,901,748 | 8/1975 | Clausen | 252/79.3 |
| 4,442,376 | 4/1984 | Van Der Waal et al. | 313/402 |
| 4,581,561 | 4/1986 | Palac | 313/474 |
| 4,884,004 | 11/1989 | Deal et al. | 313/402 |
| 4,897,213 | 1/1990 | Brink | 252/79.3 |
| 4,952,185 | 8/1990 | Lee | 445/2 |

FOREIGN PATENT DOCUMENTS

| | | | |
|---|---|---|---|
| 3330641 | 3/1985 | Fed. Rep. of Germany | 134/1 |
| 57-212735 | 12/1982 | Japan | 445/2 |
| 59-94426 | 5/1984 | Japan | 252/79.3 |
| 2148942 | 6/1985 | United Kingdom | 252/79.3 |
| 90/10609 | 9/1990 | World Int. Prop. O. | 252/79.3 |

OTHER PUBLICATIONS

H. Gourley, "Removal of Optical Coatings Without Polishing," SPIE, vol. 190, LAsL Optics Conf. (1979), pp. 73–79.

Primary Examiner—Richard K. Seidel
Assistant Examiner—Jeffrey T. Knapp
Attorney, Agent, or Firm—Joseph S. Tripoli; Dennis H. Irlbeck; Vincent J. Coughlin, Jr.

[57] ABSTRACT

A method of salvaging a color selection electrode for a CRT having a coating of a compound of a heavy metal and an alkali silicate on a surface of the electrode includes the steps of immersing the electrode in a stripping solution consisting essentially of ammonium bifluoride, a suitable detergent, and water; agitating the solution to remove the coating from the electrode; rinsing, and then drying the electrode.

18 Claims, 2 Drawing Sheets

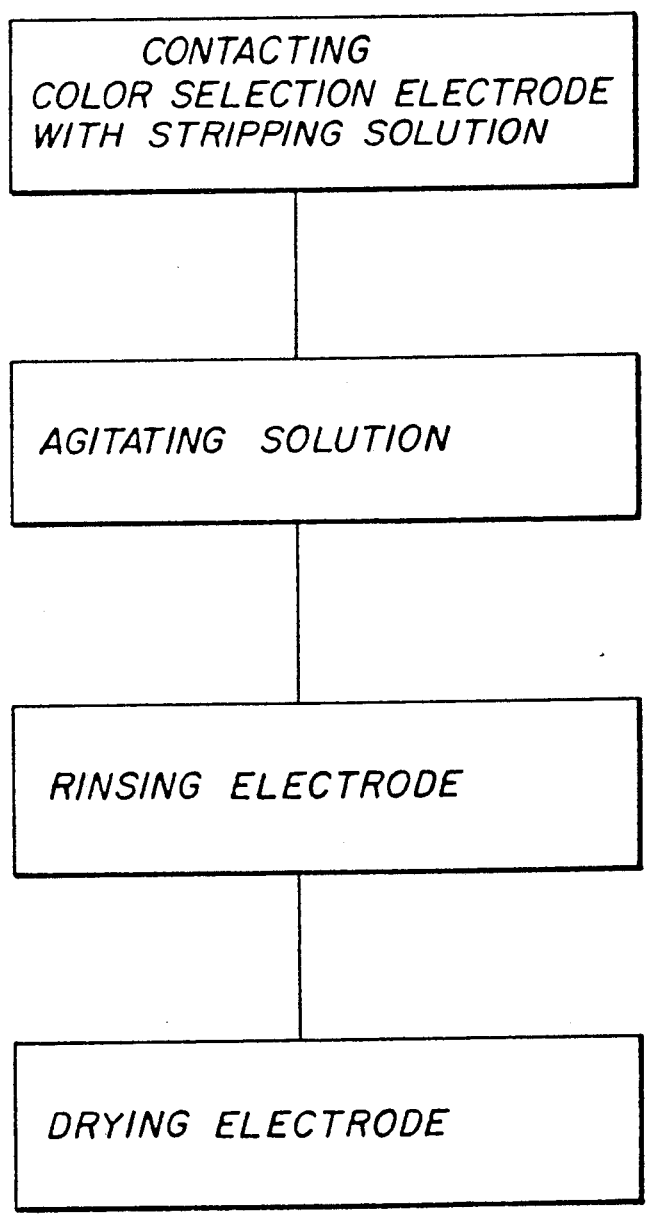

METHOD OF SALVAGING A COLOR SELECTION ELECTRODE FOR A CRT

The invention relates to a novel method for salvaging a color selection electrode for a cathode-ray tube (CRT) and, more particularly, to a method of salvaging such an electrode which has a coating of a compound of a heavy metal and an alkali silicate on a surface thereof.

BACKGROUND OF THE INVENTION

U.S. Pat. No. 4,884,004, issued on Nov. 28, 1989 to Deal et al., discloses a heat dissipative, electron reflective coating which is applied to a surface of the color selection electrode or shadow mask of a color CRT. The coating comprises a compound selected from the group consisting of bismuth (tri)oxide-potassium silicate and tungsten-potassium silicate.

The color CRT comprises an evacuated envelope with a multibeam electron gun at one end and a cathodoluminescent screen at the other end. A shadow mask is located adjacent to the screen. During operation of the CRT, only a small percentage of each electron beam passes through apertures in the shadow mask and impinges upon the screen. At about the center of the shadow mask, the masking plate intercepts all but about 18% of the beam; that is, the shadow mask is said to have a transmission of about 18%. The electrons comprising the remaining 82% of the beam are intercepted by the mask plate on their way to the screen. For shadow masks not having the coating described in U.S. Pat. No. 4,884,004, the kinetic energy of the intercepted electrons is converted to thermal energy with an increase in shadow mask temperatures resulting in thermal expansion of the mask. Since the shadow mask is usually supported by a frame of substantial mass, the temperature of the mask during initial warm-up will rise more rapidly in the center than at the edge. This causes the mask to dome, so that the center portion of the mask moves toward the screen, while the edge of the mask maintains its spacing with the screen. Furthermore, when a large number of electrons impinge upon a local area of the mask, to create high picture brightness, localized doming or blister warpage occurs unless temperature equilibrium in the plane of the mask is reestablished sufficiently rapidly. Both blister warpage and overall doming of the mask result in color errors due to electron beam misregister with the phosphor elements of the screen. The coating materials described in U.S. Pat. No. 4,884,004 are effective in reducing doming and blister warpage when the coating is applied to the electron gun-facing surface of the shadow mask.

Since the cost of a shadow mask assembly, i.e., a shadow mask and frame, increases with increasing CRT size, it is desirable to have a method of salvaging the coated shadow mask assembly by removing a defective or otherwise unacceptable coating therefrom.

SUMMARY OF THE INVENTION

The present invention relates to a method of salvaging a color selection electrode for a CRT. The electrode has a coating of a compound of a heavy metal and an alkali silicate on a surface thereof. The method comprises the steps of immersing the electrode in a stripping solution consisting essentially of ammonium bifluoride, a suitable detergent, and water; agitating the solution to remove the coating from the surface; and rinsing and drying the electrode.

BRIEF DESCRIPTION OF THE DRAWINGS

FIG. 3 is a block diagram of the sequence of steps in the novel method.

DETAILED DESCRIPTION OF THE PREFERRED EMBODIMENT

Figure 1:
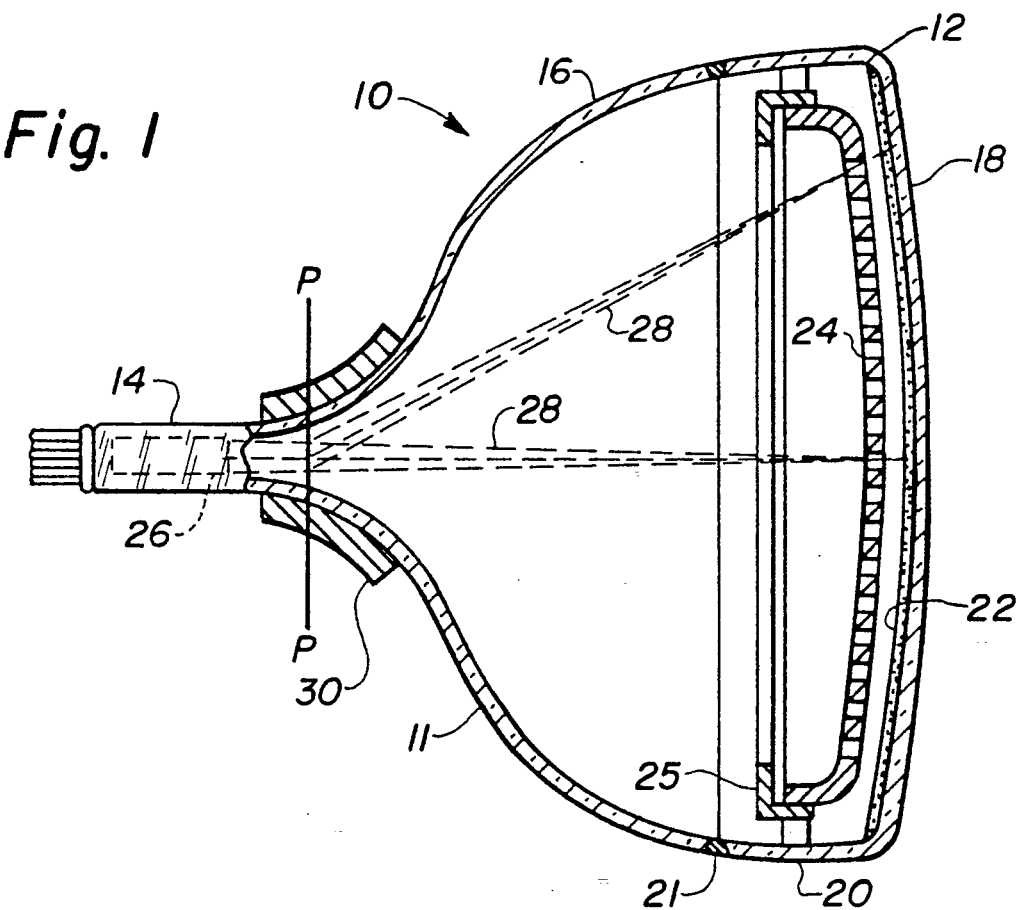
FIG. 1 is a plan view, partially in axial section, of a cathode-ray tube, CRT.

FIG. 1 shows a rectangular color cathode-ray tube 10, e.g., a color television picture tube or a display tube, having an evacuated glass envelope 11 comprising a rectangular faceplate panel 12 and a tubular neck 14 connected by a rectangular funnel 16. The panel 12 comprises a viewing faceplate 18 and a peripheral flange or sidewall 20 which is sealed to the funnel 16 by a frit seal 21. A mosaic three-color phosphor screen 22 is located on the inner surface of the faceplate 18. The screen preferably is a line screen with the phosphor lines extending substantially perpendicular to the high frequency raster line scan of the tube (normal to the plane of FIG. 1). Alternatively, the screen could be a dot screen. A multiapertured color selection electrode or shadow mask assembly includes a shadow mask 24 and an attached frame 25. The assembly is removably mounted, by conventional means, in predetermined spaced relation to the screen 22. An electron gun 26, shown schematically by dashed lines in FIG. 1, is centrally mounted within the neck 14 to generate and direct at least one electron beam, and preferably three beams 28, through the mask 24 and toward the screen 22.

The tube of FIG. 1 is designed to be used with an external magnetic deflection yoke, such as yoke 30, located in the region of the funnel-to-neck junction. When activated, the yoke 30 subjects the three beams 28 to magnetic fields which cause the beams to scan horizontally and vertically in a rectangular raster over the screen 22. The initial plane of deflection (at zero deflection) is shown by the line P—P in FIG. 1, at about the middle of the yoke 30.

Figure 2:
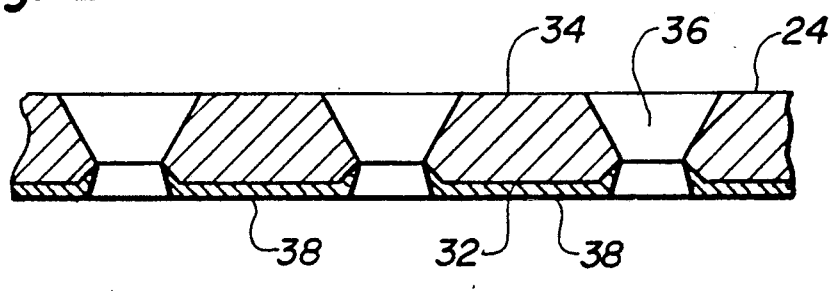
FIG. 2 is a sectional view of a color selection electrode of the CRT shown in FIG. 1.

As shown in FIG. 2, the shadow mask 24 has an obverse or O-side 32 facing the electron gun 26, a reverse or R-side 34 facing the screen 22 and a plurality of apertures 36 formed therethrough. A heat dissipative and electron reflective coating 38 covers the O-side 32 of the mask 24. The coating 38 is described in U.S. Pat. No. 4,884,004 and comprises a compound selected from the group consisting of bismuth oxide-potassium silicate and tungsten-potassium silicate.

A novel method for salvaging the shadow mask assembly by removing the coating from the O-side of the mask 24 is illustrated by the block diagram of FIG. 3. The shadow mask assembly comprising the coated shadow mask 24 and the attached frame 25 are contacted by a stripping solution consisting essentially of ammonium bifluoride, having a concentration of about 1 to 10%, by weight, 3 to 5%, by weight, being preferred; a suitable detergent such as liquid Ajax, Formula 409, or the like, having a concentration of about 0.1%, by weight; and the balance, deionized water. Preferably, the mask and frame are immersed in a tank containing the stripping solution for about 15 to 60 seconds, the time being inversely related to the concentration of the ammonium bifluoride in the solution. The function of the detergent is to prevent the redeposition of inorganic matter in the stripping solution onto the mask and to retard the removal of a magnetite layer from the mask. The stripping solution is maintained at about 23° C., i.e., room temperature. The stripping solution is agitated, e.g., by applying ultrasonic energy thereto, to improve its cleaning efficiency. Next, the assembly is rinsed in deionized water which also is maintained at room temperature. The assembly may be either immersed in a tank of deionized water and the water agitated by applying ultrasonic energy thereto, or the assembly may be spray rinsed with at least one spray nozzle, the water pressure being maintained at a pressure sufficient to remove the residue from the assembly but low enough to prevent distortion of the mask. Finally, the assembly is dried, preferably in a stream of heated air having a temperature within the range of about 150° to 250° C. for about 30 to 45 seconds, or until the assembly is dry, completely.

EXAMPLE 1

In order to determine the optimum concentration of ammonium bifluoride ($NH_4FHF$), an aqueous stripping solution was prepared (without detergent) to determine the effect of the solution on the bismuth oxide-potassium silicate coating that had been applied to an AK steel mask and baked at 450° C. for 1 hour to approximate the frit seal and exhaust cycle of a CRT. The results are shown in TABLE 1. A concentration of 5 wt % ammonium bifluoride, applied for 60 seconds, removed the coating without damaging the magnetite layer on the surface of the mask.

TABLE 1

| $NH_4FHF$ concen- tration | 15 seconds | | 60 seconds | | 300 seconds | |
|---|---|---|---|---|---|---|
| | coat- ing | magnetite | coat- ing | magnetite | coating | magnetite |
| 0.0 wt % | 1 | 1 | 1 | 1 | 1 | 1 |
| 0.1 wt % | 1 | 1 | 1 | 1 | 3 | 5 |
| 0.5 wt % | 1 | 1 | 2 | 1 | 4 | 5 |
| 1.0 wt % | 2 | 1 | 3 | 1 | 4 | 5 |
| 5.0 wt % | 3 | 1 | 4 | 1 | 4 | 5 |
| 10.0 wt % | 3 | 1 | 4 | 1 | 5 | 5 |

1 = No Effect
2 = Partially Removed
3 = Nearly Removed
4 = Removed
5 = Damaged

EXAMPLE 2

Additional tests were conducted to optimize the process and to determine the effects of the addition of a quantity of detergent or dispersant on the stripping solution and on the samples. The mask samples were prepared by applying a bismuth oxide-potassium silicate coating to one surface of 3.8cm² AK steel pieces that were then heated at 450° C. for one hour to stabilize the coating. Four stripping solutions were prepared, each consisted essentially of an aqueous solution of 5%, by weight, ammonium bifluoride. One was a control solution and the others contained about 0.1 wt % of a detergent or dispersant. Coated samples were immersed in each of the four stripping solutions for 15, 30, 45 and 60 seconds. The stripping solutions were ultrasonically agitated by using a Bransonic 12, 80 watt unit which produced cavitation of the solutions to increase the efficiency of the solutions in removing the coatings from the samples. Each sample was rinsed in ultrasonically activated, deionized water, which was maintained at room temperature, for about 15 seconds and then dried at a maximum temperature of 250° C. for 30 seconds. The results are summarized in TABLE 2. Good results were achieved with solutions number 2 and 4 which contained 0.1%, by weight, liquid Ajax and liquid Formula 409, respectively. The two detergent-containing stripping solutions uniformly removed the coating and prevented its redeposition while not adversely affecting the magnetite layer on the sample pieces. Of the two detergents, Ajax was determined to be slightly more effective in preventing redeposition. Solution number 1 (control) and number 3 (dispersant) failed to prevent redeposition of the inorganic matter in the stripping bath onto the surface of the samples and, thus, created a mottled surface appearance.

TABLE 2

| Solu- tion No. | $NH_4FHF$ weight (g) | $H_2O$ weight (g) | Additive weight (g) | Sample surface |
|---|---|---|---|---|
| 1 | 25.0 | 475.0 | none | Mottled |
| 2 | 25.0 | 474.5 | 0.5, Ajax | Uniform Grey |
| 3 | 25.0 | 474.5 | 0.5, Tamol 731* | Mottled |
| 4 | 25.0 | 474.5 | 0.5, Formula 409 | Generally Uniform |

*Tamol 731 is a surfactant which acts as a dispersant and is manufactured by Rohm & Haas, Phila., PA.

EXAMPLE 3

In this test all stripping solutions contained Ajax as a detergent in a concentration of 0.1%, by weight. The concentration of ammonium bifluoride was varied from 1 to 10 percent, by weight, and the immersion time for the coated AK steels samples, prepared as described above, ranged from 15 to 240 seconds. The samples were all ultrasonically rinsed for 15 seconds and hot air dried at a maximum temperature of 250° C. The results are presented in TABLE 3.

TABLE 3

| $NH_4FHF$ concen- tration wt. % | 15 sec | | 30 sec | | 60 sec | | 120 sec | | 180 sec | | 240 sec | |
|---|---|---|---|---|---|---|---|---|---|---|---|---|
| | coating | magnetite | coating | magnetite | coating | magnetite | coating | magnetite | coating | magnetite | coating | magnetite |
| 1.0 | not tested | | 3 | 1 | 4 | 1 | 4 | 2 | 4 | 2 | not tested | |
| 5.0 | 3 | 1 | 4 | 1 | 4* | 1 | 4* | 2 | not tested | | not tested | |
| 7.5 | 4 | 1 | 4 | 1 | 4 | 1 | 4 | 2 | not tested | | 4* | $Fe_3O_4$ |
| 10.0 | 4 | 1 | 4 | 2 | 4 | 2 | 4* | 3** | not tested | | not tested | |

1. no effect
2. partially removed
3. nearly removed
4. removed
5. destroyed
*slightly mottled
**thin and failing

CONCLUSIONS

The optimum immersion time for removing the coating from the test samples, shown in TABLE 3, varies with the solution concentration. A 60 second immersion in a 1 wt % ammonium bifluoride stripping solution is equivalent to a 30 second immersion in a 5 wt % solution and to a 15 second immersion in a 10 wt % solution. There is less evidence of damage to the magnetite layer formed on the AK steel samples when about 0.1 wt % of a detergent is added to the stripping solution. Additionally, the detergent also produces cleaner samples because it prevents the redeposition of inorganic particles suspended in the stripping solution. The novel stripping solution having a concentration of 5 wt % ammonium bifluoride also successfully removed a tungsten-potassium silicate coating, similar to that described in U.S. Pat. No. 4,884,004, from prepared samples.

Sample pieces stripped of their coatings have been exposed to ambient conditions for several months without rusting. It appears as if the samples are unlikely to rust if the magnetite layer is undamaged. Shadow masks salvaged by the novel process can be recoated on the O-side thereof by the method described in U.S. Pat. No. 4,884,004 to provide a heat dissipative, electron reflective coating.

What is claimed is:

1. A method of salvaging a color selection electrode for a CRT, said electrode having a coating on a surface thereof, said coating comprising a compound of a heavy metal and an alkali silicate, the method comprising the steps of
    contacting said electrode with a stripping solution consisting essentially of ammonium bifluoride, a suitable detergent, and water;
    agitating said solution, to remove said coating from said surface;
    rinsing said electrode; and
    drying said electrode.

2. The method as described in claim 1, wherein said solution comprises about 1 to 10%, by weight, ammonium bifluoride, about 0.1%, by weight, detergent, the balance being deionized water.

3. The method as described in claim 2, wherein said solution is maintained at about room temperature.

4. The method as described in claim 3, wherein said electrode is immersed in said solution for about 15 to 60 seconds.

5. The method as described in claim 4, wherein said immersion time is inversely related to the concentration of said ammonium bifluoride in said solution.

6. The method as described in claim 1, wherein agitating includes applying ultrasonic energy to said solution.

7. The method as described in claim 1 wherein rinsing includes the substeps of
    i) immersing said electrode in deionized water, and
    ii) applying ultrasonic energy to said water.

8. The method as described in claim 1, wherein rinsing includes directing at least one spray of water onto said electrode.

9. The method as described in claim 1, wherein drying comprises
    exposing said electrode to a stream of air heated within the range of about 150° to 250° C. for a time sufficient to dry said electrode completely.

10. The method as described in claim 9 wherein said time ranges from about 30 to 45 seconds.

11. A method of salvaging a shadow mask assembly for a CRT, said assembly including a frame and a shadow mask, said shadow mask having a heat dissipative, electron reflective coating on a surface thereof, said coating comprising a compound selected from the group consisting of bismuth (tri)oxide-potassium silicate and tungsten-potassium silicate, the method comprising the steps of
    immersing said assembly in a container having therein a stripping solution consisting essentially of ammonium bifluoride, a suitable detergent, and deionized water;
    applying ultrasonic energy to said container to produce cavitation of said solution, thereby increasing the efficiency of said solution to remove said coating from said surface of said mask;
    rinsing said assembly; and
    drying said assembly.

12. The method as described in claim 11, wherein said solution comprises 1 to 10%, by weight, ammonium bifluoride, about 0.1%, by weight, detergent, the balance being deionized water.

13. The method as described in claim 12, wherein said solution is maintained at about room temperature.

14. The method as described in claim 13, wherein said assembly is immersed in said solution for about 15 to 60 seconds.

15. The method as described in claim 14, wherein said immersion time is inversely related to the concentration of said ammonium bifluoride in said solution.

16. The method as described in claim 11, wherein rinsing includes the substeps of
    i) immersing said assembly in deionized water, and
    ii) applying ultrasonic energy to said water.

17. The method as described in claim 11, wherein rinsing includes directing at least one spray of water onto said electrode.

18. The method as described in claim 11, wherein drying comprises
    exposing said assembly to a stream of air heated within the range of about 150° to 250° C. for about 30 to 45 seconds to dry said assembly completely.

* * * * *